Nov. 3, 1936.  B. R. CARSON  2,059,206
INTERMITTENT FILM FEEDING MECHANISM
Filed Jan. 30, 1934
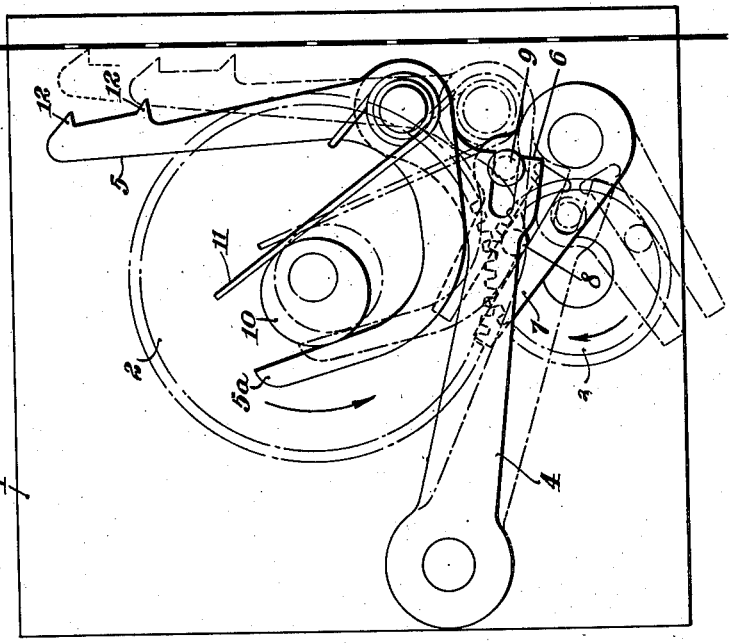
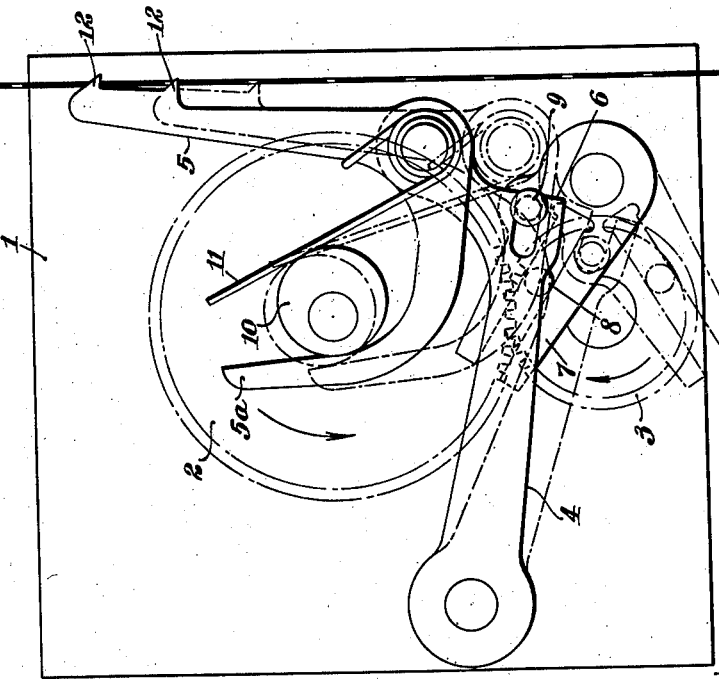
INVENTOR:
Benjamin R. Carson,
BY  J. R. Goldsborough
ATTORNEY.

Patented Nov. 3, 1936

2,059,206

UNITED STATES PATENT OFFICE 2,059,206

INTERMITTENT FILM FEEDING MECHANISM

Benjamin R. Carson, Camden, N. J., assignor to Radio Corporation of America, a corporation of Delaware Application January 30, 1934, Serial No. 708,960

5 Claims. (Cl. 88—18.4)

My invention relates to moving picture apparatus and more particularly to intermittent film feeding mechanism of the claw type.

In moving picture projectors, particularly those used in the amateur field, it is desirable to have as much illumination on the screen as possible. One way of increasing the amount of illumination is to make the time interval during which the film is intermittently moved past the light station as short as possible, so that the time interval during which the film remains stationary and is exposed to light is as long as possible. It is, therefore, the primary object of my invention to provide an improved intermittent feed mechanism of the type set forth which is characterized by a very short film feeding period and which is arranged to permit a relatively long light exposure interval for the film.

Another object of my invention is to provide an improved intermittent film feeding mechanism of the aforesaid type which is quiet in operation.

A further object of my invention is to provide an improved intermittent film feeding mechanism of the type mentioned which permits facile threading of the film regardless of the position in which the claw may be at the time of threading.

Still another object of my invention is to provide an improved intermittent film feeding mechanism of this type which is highly efficient in operation, which is comprised of a minimum number of parts consistent with such efficiency, and which is economical of manufacture.

In accordance with my invention, I provide a claw which is constrained against a rotary cam member mounted on a gear and adapted to impart motion to the claw toward and away from the film. A second gear meshing with the first gear and rotatable at twice the speed of the latter has associated with it mechanism for imparting movement to the claw longitudinally of the film. The parts are so arranged that for every two reciprocatory excursions of the claw longitudinally of the film the claw engages the film only once and advances it in 60° of the cycle.

The novel features which I consider characteristic of my invention are set forth with particularity in the appended claims. The invention itself, however, together with additional objects and advantages thereof, will best be understood from the following description of a specific embodiment, when taken in connection with the accompanying drawing in which Fig. 1 is a side elevation of my improved intermittent film feeding mechanism showing, in solid lines, the position of the parts just as the claw is about to advance the film and, in dot-dash lines, the position of the parts just after the claw has finished advancing the film, and Fig. 2 is a similar view showing, in solid lines, the position of the parts just as the claw has reached the end of its return movement after having advanced the film; in dot-dash lines, the position of the parts just as the claw has reached the end of its next forward movement; and in dotted lines, a fragment of the claw showing the position it assumes just as it is about to engage the film the next succeeding time and immediately prior to the full line position of Fig. 1.

Referring to the drawing, wherein similar reference numerals designate similar parts throughout, there is shown a supporting plate 1 on which are rotatably mounted a pair of meshed gears 2 and 3, the gear 2 driving the gear 3 and rotating at half the speed of the gear 3, each in the direction of the appended arrow. Pivotally mounted on the plate 1 to one side of the gears 2 and 3 is a substantially L-shaped arm 4 which pivotally supports a substantially U-shaped film engaging claw 5 and which is provided with a yoke 6 at the intersection of the two legs of the "L". A yoke member 7 is also pivoted on the plate 1 but adjacent the gear 3 and receives a pin 8 mounted eccentrically on the gear 3. A second pin 9 carried by the yoke member 7 is received by the yoke 6. Thus, as the gear 3 rotates, the pin 8 imparts reciprocatory motion to the yoke member 7 longitudinally of a film F which is being fed through the machine, and this reciprocatory movement of the yoke member 7 causes reciprocatory movement of the supporting arm 4 and the claw 5, also longitudinally of the film F.

Formed on the gear 2 eccentrically to its axis of rotation is a cylindrical hub 10 against which the offset portion or arm 5a of the claw 5 is constrained to bear by a spring 11. By reason of the eccentric mounting of the hub 10, it acts as a cam member to cause the claw 5 to move toward and away from the film F, the teeth 12 of the claw 5 engaging the film F at its sprocket holes whenever the hub or cam member 10 is in the position shown in solid lines in Fig. 1. In this position, it will be noted that the yoke member 7 is at the limit of its upward travel and just about to begin its return movement during which it will, of course, carry the claw 5 with it and cause the claw to advance the film a distance of one frame.

By the time the film will have been advanced one frame, the cam member 10 will have moved to its dotted line position in Fig. 1, in which position it will just about effect the withdrawal of the teeth 12 from the film F. Continued rotation of the gear 3 then causes the yoke member 7 to again move to the limit of its upward travel, or to the solid line position of Fig. 2, but since, during this time, the cam member 10 bears against the arm 5a on a gradually increasing radius, the claw 5 is moved away from the film F as it is being raised so that it assumes the solid line position of Fig. 2 when the yoke member 7 has reached the limit of its next upward travel. Further rotation of the gear 3 again lowers the yoke member 7 together with the claw 5, while at the same time, the arm 5a engages the cam member 10 on a gradually decreasing radius, enabling the claw 5 to again approach the film. At the limit of the then downward travel of the yoke member 7, the claw 5 is in the dot-dash line position of Fig. 2.

As the yoke member 7 again begins to move upwardly in response to the movement of the gear 3, the cam member 10, still rotating on a decreasing radius with respect to the arm 5a, permits the claw 5 to still further approach the film F until just prior to the time the yoke member 7 has again reached the limit of its upward travel, at which time the teeth 12 contact the adjacent surface of the film F, as shown in dotted lines in Fig. 2. When the yoke member has actually reached its upward limit again, the teeth slip into the sprocket holes of the film under the action of the spring 11 and the cycle is ready to be repeated.

It will be seen from the foregoing that the claw 5 is caused to engage the film F during only every other forward, or downward, movement thereof longitudinally of the film. In practice, the gear 2 may be revolved at 1440 R. P. M., for example, and the gear, 3, at 2880 R. P. M. By making the angle of pull down of the pin 120°, the claw will effect a 60° pull down, leaving a 300° light interval. Thus, I am able to provide a simple, although efficient, intermittent film feeding mechanism which not only permits relatively greater illumination of the screen but which is, at the same time, very quiet in operation. At the same time, my improved mechanism permits facile threading of the film because, no matter what the position of the claw 5 may be, it can easily be moved back against the action of the spring 11 and the film slipped into place.

While I have shown and described a specific embodiment of my invention, I am fully aware that many modifications thereof are possible. My invention, therefore, is not to be limited except insofar as is necessitated by the prior art and by the spirit of the appended claims.

I claim as my invention:

1. Film feeding mechanism comprising a driving gear, a second gear driven thereby, a film engaging claw, a pivotally mounted supporting arm for said claw, a cam member on said driving gear for moving said claw toward and away from a film whereby to cause said claw to intermittently engage the film, a pivoted yoke member, a pin eccentrically mounted on said driven gear and received by said yoke member whereby to impart reciprocatory movement to said yoke member longitudinally of the film, and means interconnecting said yoke member and said supporting arm whereby the reciprocatory movement of said yoke member may be transferred to said claw for causing said claw to intermittently advance said film while in engagement therewith.

2. Film feeding mechanism comprising a driving gear, a second gear driven thereby, a film engaging claw, a pivotally mounted supporting arm for said claw, said supporting arm being provided with a yoke, a cam member on said driving gear for moving said claw toward and away from a film whereby to cause said claw to intermittently engage the film, a pivoted yoke member, a pin eccentrically mounted on said driven gear and received by said yoke member whereby to impart reciprocatory movement to said yoke member longitudinally of the film, and a second pin on said yoke member, said second pin being received by said supporting arm yoke whereby the reciprocatory movement of said yoke member may be transferred to said supporting arm and claw to cause said claw to intermittently advance said film while in engagement therewith.

3. The invention set forth in claim 2 characterized by the addition of spring means for constraining the claw against said cam member.

4. The invention set forth in claim 2 characterized in that the driving gear is rotated at half the rotary speed of the driven gear and characterized further in that the cam causes the claw to engage the film during only every other forward movement thereof longitudinally of the film in response to the yoke member.

5. Film feeding mechanism comprising a driving gear, a second gear driven thereby, a pivotally mounted supporting arm, a film engaging claw pivoted on said supporting arm for movement toward and away from a film, a cam member on said driving gear for moving said claw toward and away from the film about its pivot whereby to cause said claw to intermittently engage the film, a pivoted yoke member, a pin eccentrically mounted on said driven gear and received by said yoke member whereby to impart reciprocatory movement to said yoke member longitudinally of the film, and means interconnecting said yoke member and said supporting arm whereby the reciprocatory movement of said yoke member may be transferred to said claw for causing said claw to intermittently advance said film while in engagement therewith.

BENJAMIN R. CARSON.